(12) United States Patent
Carty

(10) Patent No.: US 6,601,867 B2
(45) Date of Patent: Aug. 5, 2003

(54) BREAKAWAY COUPLER ASSEMBLY

(75) Inventor: William E. Carty, Tempe, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 16 days.

(21) Appl. No.: 09/826,781

(22) Filed: Apr. 5, 2001

(65) Prior Publication Data

US 2002/0145269 A1 Oct. 10, 2002

(51) Int. Cl.[7] .............................................. B60D 1/30
(52) U.S. Cl. ........................ 280/483; 280/488; 280/504
(58) Field of Search ................................ 280/183–485, 280/488, 504, 511, 512

(56) References Cited

U.S. PATENT DOCUMENTS

| | | | |
|---|---|---|---|
| 2,168,148 A | * 8/1939 | Arehart | 280/33.9 |
| 3,529,851 A | 9/1970 | Hines | 280/432 |
| 3,612,506 A | 10/1971 | Malherbe | 280/455.1 |
| 3,700,263 A | * 10/1972 | Day | 280/415 A |
| 3,796,288 A | 3/1974 | Hollnagel | 280/455.1 |
| 3,907,122 A | 9/1975 | Ksienysk et al. | 280/484 |
| 3,961,813 A | 6/1976 | Thomas | 280/485 |
| 4,077,650 A | 3/1978 | Leach, Jr. | 280/484 |
| 4,773,668 A | * 9/1988 | Muonro | 280/485 |
| 4,978,133 A | 12/1990 | Thorne et al. | 280/484 |
| 5,558,351 A | 9/1996 | Hunter | 280/432 |
| 5,562,298 A | * 10/1996 | Kass et al. | 280/406.2 |
| 5,630,605 A | 5/1997 | Smallwood | 280/432 |
| 5,647,604 A | * 7/1997 | Russell | 280/492 |
| 5,683,094 A | 11/1997 | Gullickson | 280/485 |
| 5,823,560 A | 10/1998 | Van Vleet | 280/484 |
| 5,868,415 A | * 2/1999 | Van Vleet | 280/483 |

* cited by examiner

Primary Examiner—Lesley D. Morris
Assistant Examiner—L. Lum
(74) Attorney, Agent, or Firm—Jeffer, Mangels, Butler & Marmaro LLP

(57) ABSTRACT

A trailer having a tongue that defines a longitudinal axis and includes a coupler portion. The coupler portion of the tongue can pivot relative to the longitudinal axis, thereby forming an angle between the coupler portion and the longitudinal axis. In a preferred embodiment, the tongue includes a breakaway coupler assembly. The breakaway coupler assembly includes the coupler portion having a distal end adapted to engage a towing vehicle, and a flex-joint pivotally engaged with the coupler portion. This allows the coupler portion to pivot relative to said flex-joint when a predetermined force is placed on the flex-joint, such as in a jack-knife situation.

13 Claims, 3 Drawing Sheets

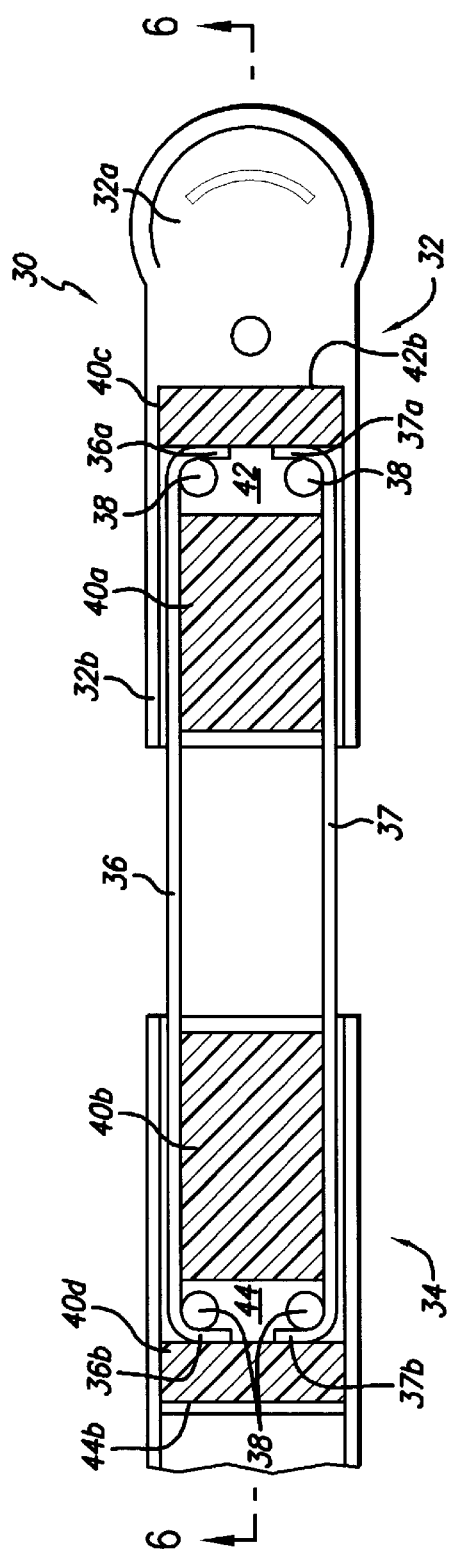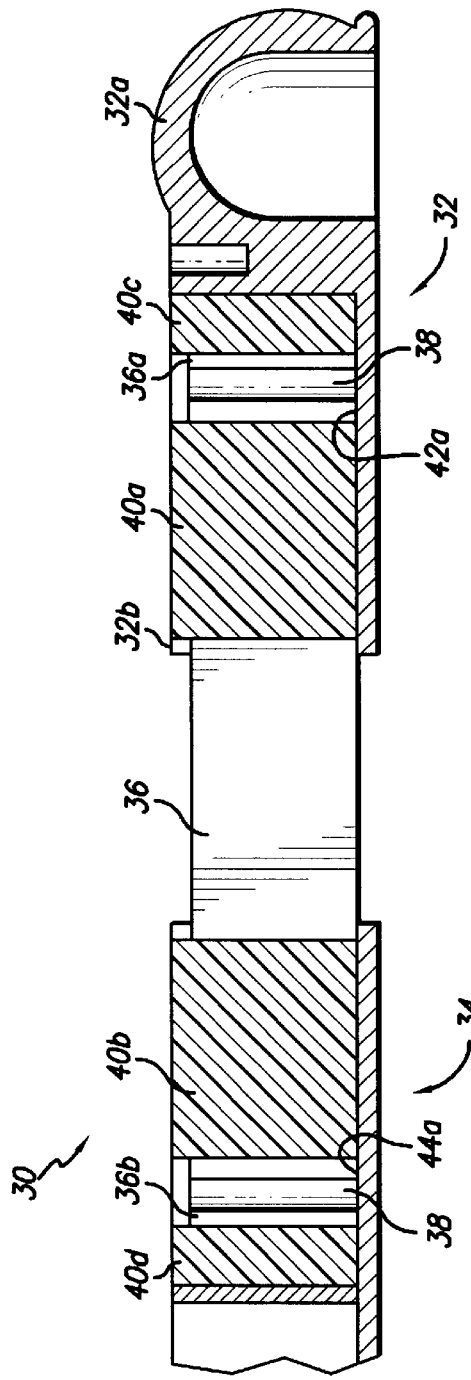

BREAKAWAY COUPLER ASSEMBLY

FIELD OF THE INVENTION

The present invention relates to the field of trailer tongues.

BACKGROUND OF THE INVENTION

When operating a towing vehicle and a trailer the possibility of the trailer jackknifing exists. Jackknifing is an uncontrollable over-articulation between the towing vehicle and the trailer and can often cause damage to the trailer tongue and/or towing vehicle. Jackknifing often occurs when backing the trailer or when operating the vehicle/trailer combination on a slippery road surface, among other situations.

The trailer tongue is particularly susceptible to bending damage because of its typically elongated configuration. When jackknifing of a trailer occurs, the tongue is often damaged beyond repair. Various anti-jackknifing devices have been previously proposed. However, many of these devices are either extremely complex or have proven ineffective.

Devices for dampening or absorbing shock and vibration in the hitch assembly are also known. Many of these devices use elastomeric materials to absorb the forces created by vibrations, etc. However, these devices are ineffective in a jackknife situation. They are strictly employed to absorb shock and vibration to allow for a smoother ride and to prevent damage to the hitch assembly itself. Examples of such devices are U.S. Pat No. 5,823,560 to Van Vleet, U.S. Pat. No. 5,683,094 to Gullickson and U.S. Pat. No. 4,978,133 to Thorne et al.

A long felt need exists for a device that minimizes occurrences of bending damage in jackknife situations.

SUMMARY OF THE PREFERRED EMBODIMENTS

In accordance with a first aspect of the present invention there is provided a trailer having a tongue that defines a longitudinal axis and includes a coupler portion. The coupler portion of the tongue can pivot relative to the longitudinal axis, thereby forming an angle between the coupler portion and the longitudinal axis. In a preferred embodiment, the tongue includes a breakaway coupler assembly. The breakaway coupler assembly includes the coupler portion having a distal end adapted to engage a towing vehicle, and a flex-joint pivotally engaged with the coupler portion. This allows the coupler portion to pivot relative to the flex-joint.

In another preferred embodiment, the tongue includes (a) a pair of elongated bars having first and second opposite ends, wherein each end is angled, (b) a coupler portion having first and second ends, wherein the first end is adapted to engage a towing vehicle, and has a pair of posts extending upwardly therefrom, (c) a rear portion spaced from the coupler portion that includes a pair of posts extending upwardly therefrom, (d) a first resilient member adjacent a top surface of the coupler portion and disposed between the pair of elongated bars, (f) a second resilient member adjacent a top surface of the rear portion and disposed between the pair of elongated bars, (g) a third resilient member adjacent a top surface of the coupler portion and adjacent the first ends of the elongated bars, and (h) a fourth resilient member adjacent a top surface of the rear portion and adjacent the second ends of the elongated bars. The first ends of the elongated bars each engage one of the posts on the coupler portion and the second ends of the elongated bars each engage one of the posts on the rear portion.

In accordance with another aspect of the present invention there is provided a breakaway coupler assembly including a coupler portion, a bar extending downwardly from the coupler portion, a tubular member at least partially surrounding the bar, and at least one resilient member disposed between an interior surface of the tubular member and the bar.

In accordance with yet another aspect of the present invention there is provided a method of preventing damage to a tongue of a trailer including the step of providing a flex-joint on the tongue.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which

FIG. 5 is a top plan view of a breakaway hitch assembly in accordance with a second embodiment of the present invention.

FIG. 6 is a cross-sectional side view of the breakaway hitch assembly taken along line 6—6 of FIG. 5.

Like numerals refer to like parts throughout the several views of the drawings.

DETAILED DESCRIPTION OF THE PREFERRED EMBODIMENTS

Figure 1:
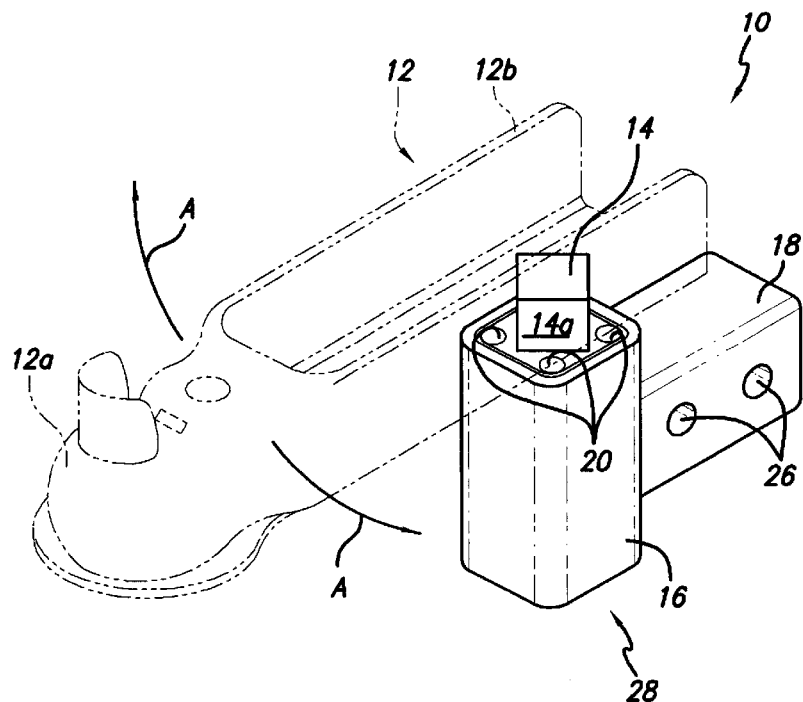
FIG. 1 is a perspective view of a breakaway hitch assembly showing the coupler portion in phantom in accordance with a first embodiment of the present invention.

With reference generally to FIGS. 1–4, a first embodiment of a breakaway coupler assembly 10 is shown. The breakaway coupler assembly 10 generally includes a coupler portion 12, a bar 14, a tubular member 16, a connection member 18 and a plurality of biasing elements 20. It will be appreciated that terms such as "rearwardly," "bottom," "downwardly," "top," "rear" and "upwardly" used hereinbelow are used merely for ease of description and refer to the orientation of the components as shown in the Figures. It should be understood that any orientation of the breakaway coupler assembly 10 described herein is within the scope of the present invention.

Figure 2:
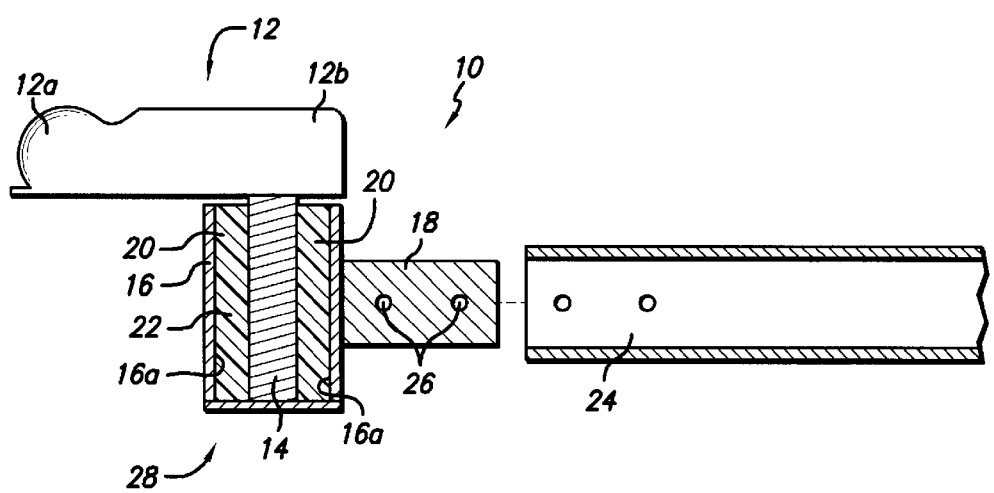
FIG. 2 is a partially exploded cross-sectional side view of the break away hitch assembly of FIG. 1 and a corresponding trailer tongue.
Figure 3:
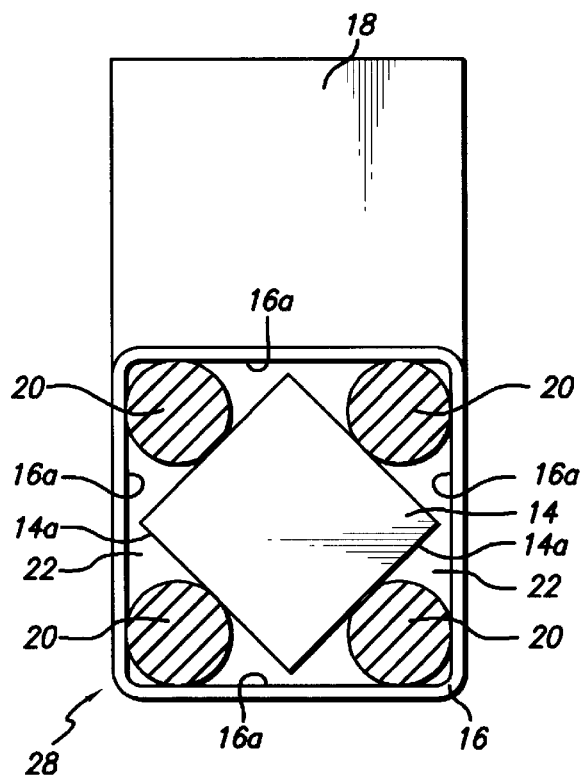
FIG. 3 is a top plan view of the resilient portion showing the bar and biasing elements in an unloaded position.

Referring to FIGS. 1–3, in a preferred embodiment, coupler portion 12 is substantially similar to the distal end of a trailer tongue having a conventional hitchball coupler. It will be understood that the type of hitch connection (such as a hitchball) is not a limitation on the present invention. For example, different sized hitchball couplers, as well as eye and pintle arrangements or pin and clevis assemblies can be used. Coupler portion 12 has first and second ends 12a, 12b. The first end 12a is adapted to engage a hitchball of a towing vehicle (not shown). Bar 14 extends downwardly from the coupler portion 12 at a point spaced from the first end 12a, preferably proximate the second end 12b. Bar 14 is preferably affixed to coupler portion 12 by welding, adhering or the like. Alternatively, bar 14 can be received in an opening in coupler portion 12 and bolted, pinned or otherwise secured therein, such that bar 14 cannot move relative to coupler portion 12.

Tubular member 16 and bar 14 are preferably square with respect to their transverse axes, as shown in FIG. 1. However, tubular member 16 and bar 14 can be any shape with surfaces/sides that meet at an angle. For example, they can be triangular or rectangular. Tubular member 16 defines an interior 22 and is open at its top end. In a preferred embodiment, bar 14 extends into interior 22 and is coaxial with tubular member 16. Preferably, bar 14 is oriented such that it is rotated 45° about its longitudinal axis with respect to tubular member 16, as best shown in FIG. 3.

A plurality of biasing elements 20 are disposed in interior 22 between the longitudinal planar surfaces 14a of bar 14 and the corners of tubular member 16. Preferably each biasing element is in contact with a longitudinal planar surface of bar 14 and two interior surfaces 16a of tubular member 16 where the surfaces 16a meet at an angle. In a preferred embodiment, four biasing elements 20 are used. The biasing elements 20 are preferably elongated and comprised of an elastomeric material. The biasing elements 20 are preferably press fit within the tubular member 16. The biasing elements 20 are compressed sufficiently during assembly to hold bar 14 in reasonable axial alignment within tube 16, while still allowing further compression with rotational movement of bar 14. Other biasing means are within the scope of the present invention. For example, springs or pressure sensors that bias a switch when a predetermined torsion is placed on bar 14 can be employed.

Connection member 18 extends rearwardly from tubular member 16. Preferably, connection member 18 is secured via welding or the like to tubular member 16. In a preferred embodiment, connection member 18 is dimensioned so that it is fittable within a hollow trailer tongue 24 as shown in FIG. 2. Alternatively, connection member 18 may be dimensioned so that it may receive the trailer tongue 24. Preferably, connection member 18 has at least one aperture 26 defined therein for connection to trailer tongue 24. The connection can be made by threaded fasteners, pins or the like. Alternatively, connection member 18 can be secured to trailer tongue 24 via welding or other affixing method. In another embodiment, connection member 18 can be omitted, and tubular member 16 can be secured directly to the trailer tongue 24 via welding or other affixing method.

Figure 4:
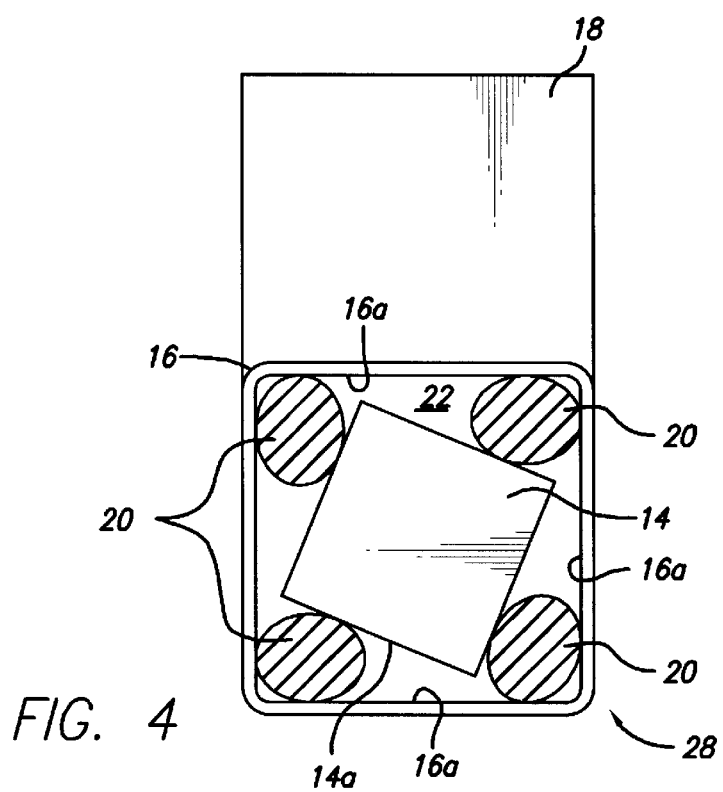
FIG. 4 is a top plan view of the resilient portion showing the bar and biasing elements in a loaded position.

For descriptive purposes, the combination of the tubular member 16 with the biasing elements 20 and bar 14 therein is referred to herein as a flex-joint 28. Referring to FIGS. 3–4, the operation of the flex-joint in a jackknifing situation will be described. During a jackknife incident the trailer is angled so sharply behind the towing vehicle that a portion of the tongue 24 makes contact with the towing vehicle. When this occurs the tongue is often damaged as a result of bending forces and the like.

In operation of the breakaway coupler assembly 10, the first end 12a of coupler portion 12 is hitched to a towing vehicle. The material of the biasing elements is selected such that it is rigid enough that during normal operation (i.e., towing the trailer) pivoting of bar 14 relative to the tubular member 16 is negligible, and bar 14 is held substantially in place as shown in FIG. 3 (unloaded position). However, the material is selected such that at application of a predetermined force on the biasing elements 20 by the rotation about its longitudinal axis of bar 14, the biasing elements 20 will be compressed as showed in FIG. 4 (loaded position). A skilled artisan can readily make such a biasing element 20 material selection. The compression of the biasing elements 20 causes the tubular member 16, and, therefore, the tongue 24 to pivot relative to bar 14 and the coupler portion 12 as shown by arrows A in FIG. 1. When the forces are relieved the biasing elements 20 bias bar 14 back to the unloaded position.

During a jackknife incident, if the tongue 24 makes contact with the towing vehicle, and the predetermined load limit of the flex-joint 28 is exceeded, the trailer and tongue will "breakaway," thereby minimizing or preventing bending damage to the tongue 24 and coupler 12.

Referring to FIGS. 5–6, a second embodiment of a breakaway hitch assembly 30 is shown. The breakaway hitch assembly 30 generally includes a coupler portion 32, a rear portion 34, first and second elongated bars 36, 37, a plurality of posts 38 and a plurality of resilient members 40a–d.

In a preferred embodiment, coupler portion 32, as in the first embodiment above, is substantially similar to the end of a trailer tongue having a conventional hitchball coupler. It will be understood that the type of hitch connection (such as a hitchball) is not a limitation on the present invention. Coupler portion 32 has first and second ends 32a, 32b. The first end 32a is adapted to engage a hitchball of a towing vehicle. The second end 32b preferably has a recess 42 defined therein. a pair of posts 38 extend upwardly from a bottom surface 42a of recess 42. The posts 38 are preferably welded to the bottom surface 42a of recess 42. However, the posts 38 can also be formed as a unit with coupler portion 32 or adhered thereto by a known method.

Rear portion 34 has a recess 44 defined therein. A second pair of posts 38 extend upwardly from a bottom surface 44a of recess 44. The first and second elongated bars 36, 37 each have first and second ends 36a, 37a, 36b, 37b that are angled. In a preferred embodiment, the ends 36a, 37a, 36b, 37b are angled at a substantially right angle, as shown in FIG. 6. The elongated bars 36, 37 are positioned such that the first ends 36a, 37a of each partially wrap around one of the posts 38 on the coupler portion 32 and the second ends 36b, 37b of each partially wrap around one of the posts 38 on the rear portion. The interior of the angle of each end 36a, 37a, 36b, 37b is in contact relationship with the posts 38. The elongated bars 36, 37 hold the coupler portion 32 and rear portion 34 in spaced relationship.

The resilient members 40 are preferably made of an elastomeric material. In a preferred embodiment, four resilient members 40a–40d are employed. However, it will be understood that any number of resilient members can be used. The first resilient member 40a is disposed in recess 42 between the elongated bars 36, 37. The second resilient member 40b is disposed in recess 44 between the elongated bars 36, 37. The third resilient member 40c is disposed in recess 42 such that it is between the front end 42b of recess 42 and the first ends 36a, 37a of the elongated bars 36, 37. The fourth resilient member 40d is disposed in recess 44 such that it is between the rear end 44b of recess 44 and the second ends 36b, 37b of the elongated bars 36, 37, as best shown in FIG. 5. The resilient members 40a–40d are held in place in the recesses 42,44 and between the elongated bars 36,37 by a friction fit. However, the resilient members 40a–40d can also be molded or bonded in place.

Preferably, all of the components, except for the resilient members 40a–40d, are made of a rigid metal such as steel.

In operation, the posts 38 prevent the elongated bars 36, 37 from being pulled out of assembly during normal forward operation, but allow movement of the elongated bars 36, 37 into the compressible resilient members 40c, 40d when a bending load is applied. When the tongue makes contact with the towing vehicle, one of the elongated bars 36, 37 (the "outside" bar) is pulled in tension by the posts 38. The "inner" bar is driven by compressive load into resilient members 40c and 40d. The resilient members 40a–d substantially absorb the forces, thereby minimizing or preventing permanent damage. When the bending forces are relieved the resilient members 40a–40d urge the elongated bars 36, 37 back to their unloaded position.

As described above, the force limit at which the assembly 30 will "breakaway" can be changed by changing the stiffness of the resilient members 40a–40d. A skilled artisan can readily make such a determination.

The embodiments of the present invention recited herein are intended to be merely exemplary and those skilled in the art will be able to make numerous modifications to them without departing from the spirit of the present invention. For example, similar devices can include torsion springs, compression springs or tension springs. All such modifications are intended to be within the scope of the present invention as defined by the claims appended hereto.

What is claimed is:

1. A trailer comprising:
   a tongue defining a longitudinal axis;
   a coupler portion pivoting relative to said longitudinal axis, thereby forming an angle between the coupler portion and the tongue;
   a flex-joint pivotally engaged with the coupler portion, the flex-joint comprising a tubular member defining an interior, a biasing element disposed in the interior, and a bar having first and second opposite ends, wherein said first end extends into said interior and said second end is secured to said coupler portion at a point remote from a distal end of said coupler portion.

2. The trailer of claim 1 wherein said biasing element comprises an elastomeric material.

3. The trailer of claim 1 wherein said bar has a non-circular cross section relative to a transverse axis and is co-axial with said tubular member.

4. The trailer of claim 3 comprising a plurality of biasing elements disposed in said interior, wherein said biasing elements are disposed between a surface of said bar and an interior surface of said tubular member.

5. The trailer of claim 1 further comprising a connection member extending transversely from an exterior surface of said flex-joint, wherein said connection member is adapted to be connected to the trailer tongue.

6. A trailer having a tongue that defines a longitudinal axis, wherein said tongue comprises:
   a) a pair of elongated bars having first and second opposite ends, wherein each end is angled,
   b) a coupler portion having first and second ends, wherein said first end is adapted to engage a towing vehicle and pivot relative to the longitudinal axis thereby forming an angle between the coupler portion and the longitudinal axis, said coupler portion including a pair of posts extending upwardly therefrom,
   c) a rear portion spaced from said coupler portion, said rear portion including a pair of posts extending upwardly therefrom,
   d) wherein said first ends of said elongated bars each engage one of said posts on said coupler portion and wherein said second ends of said elongated bars each engage one of said posts on said rear portion,
   e) a first resilient member adjacent a top surface of said coupler portion and disposed between said pair of elongated bars,
   f) a second resilient member adjacent a top surface of said rear portion and disposed between said pair of elongated bars,
   g) a third resilient member adjacent a top surface of said coupler portion and adjacent said first ends of said elongated bars, and
   h) a fourth resilient member adjacent a top surface of said rear portion and adjacent said second ends of said elongated bars.

7. A breakaway coupler assembly comprising:
   a) a coupler portion,
   b) a bar extending downwardly from said coupler portion, said bar having a diameter,
   c) a tubular member at least partially surrounding said bar, said tubular member having an interior surface, and
   d) at least one resilient member disposed between said interior surface of said tubular member and said bar, wherein the resilient member has a diameter that is smaller than the diameter of the bar.

8. The assembly of claim 7 wherein said coupler portion has first and second ends, wherein said first end is adapted to engage a towing vehicle, and wherein said bar is secured to said coupler portion at a point remote from said first end.

9. The assembly of claim 8 further comprising a connection member extending rearwardly from said tubular member.

10. A method of preventing damage to a tongue of a trailer, the method comprising the step of providing a flex-joint on said tongue, the flex-joint comprising a tubular member defining an interior, a biasing element disposed in the interior, and a bar having first and second opposite ends, wherein said first end extends into said interior and said second end extends out of said interior and is secured to a coupler portion of said tongue, said coupler portion having a distal end, and wherein said second end of said bar is secured to said coupler portion at a point remote from a distal end of said coupler portion.

11. A breakaway coupler assembly comprising:
   a coupler portion;
   a bar extending downwardly from the coupler portion, the bar having an outer surface;
   a tubular member having an interior surface, the tubular member at least partially surrounding the bar such that the interior surface faces the outer surface of the bar, and
   a plurality of resilient members disposed between the interior surface of the tubular member and the outer surface of the bar.

12. The coupler assembly of claim 11, wherein each of the plurality of resilient members has a diameter that is smaller than a diameter of the bar.

13. The coupler assembly of claim 11 wherein the interior walls of the tubular member are not parallel is positioned at about a 45 degree angle with respect to the outer surfaces of the bar.

* * * * *